(12) United States Patent
Pinto et al.

(10) Patent No.: US 10,421,470 B2
(45) Date of Patent: Sep. 24, 2019

(54) METHOD AND SYSTEM FOR DETERMINING A VERTICAL PROFILE OF A RAIL SURFACE

(71) Applicant: Aktiebolaget SKF, Gothenburg (SE)

(72) Inventors: Elena Pinto, Alcorcón-Madrid (ES); Victor Martinez, Madrid (ES)

(73) Assignee: Aktiebolaget SKF, Göteborg (SE)

( * ) Notice: Subject to any disclaimer, the term of this patent is extended or adjusted under 35 U.S.C. 154(b) by 76 days.

(21) Appl. No.: 15/450,794

(22) Filed: Mar. 6, 2017

(65) Prior Publication Data

US 2017/0267263 A1 Sep. 21, 2017

(30) Foreign Application Priority Data

Mar. 17, 2016 (EP) ..................................... 16380010

(51) Int. Cl.
*B61K 9/08* (2006.01)
*G01C 7/00* (2006.01)
(Continued)

(52) U.S. Cl.
CPC .............. *B61K 9/08* (2013.01); *B61L 23/045* (2013.01); *B61L 23/047* (2013.01);
(Continued)

(58) Field of Classification Search
CPC .... B61L 23/045; B61L 23/047; B61L 23/048; B61L 25/025; B61L 2205/04; G01C 7/00; B61K 9/08
(Continued)

(56) References Cited

U.S. PATENT DOCUMENTS 4,741,207 A * 5/1988 Spangler ................ G01B 21/20
33/521
5,065,618 A * 11/1991 Hodges, Sr. ............. G01C 7/04
33/521
(Continued)

FOREIGN PATENT DOCUMENTS

CH 674180 A5 5/1990
EP 3219574 A1 * 9/2017 ............... B61K 9/08
(Continued)

OTHER PUBLICATIONS

El Xiukun et al: "Urban rail track condition monitoring based on in-service vehicle acceleration measurements", Measurement, vol. 80, Nov. 27, 2015 (Nov. 27, 2015), pp. 217-228, XP029358654, ISSN: 0263-2241. DOI:10.1016/J.MEASURMENT.2015.11.033.
(Continued)

*Primary Examiner* — Justin Seo
*Assistant Examiner* — Tania C Courson
(74) *Attorney, Agent, or Firm* — Bryan Peckjian; SKF USA Inc. Patent Dept.

(57) ABSTRACT

The present invention defines a method of determining a vertical profile signal of a rail surface that includes, obtaining a vertical acceleration signal $acc_1$, by measuring vertical acceleration of a bogie of a rail vehicle that runs on the rail surface; processing the vertical acceleration signal to obtain a vertical velocity signal; determining the vertical profile signal of the rail surface, by using the vertical acceleration signal and the vertical velocity signal as inputs to a simulation model of the bogie, the model having an unsprung mass connected to a sprung mass, the vertical acceleration signal $acc_1$ represents the vertical acceleration of the unsprung mass; and measuring a linear velocity signal of the rail vehicle, the linear velocity signal is used in the step of
(Continued)

determining to convert the vertical profile signal from the time domain to the distance domain.

6 Claims, 3 Drawing Sheets

(51) Int. Cl.
*B61L 23/04* (2006.01)
*B61L 25/02* (2006.01)

(52) U.S. Cl.
CPC ........... *B61L 23/048* (2013.01); *B61L 25/025* (2013.01); *G01C 7/00* (2013.01); *B61L 2205/04* (2013.01)

(58) Field of Classification Search
USPC ... 33/1 H, 521, 523, 523.1, 523.2, 533, 772, 33/773, 775, 1 Q
See application file for complete search history.

(56) References Cited

U.S. PATENT DOCUMENTS

| | | | | |
|---|---|---|---|---|
| 5,579,013 | A * | 11/1996 | Hershey | B61K 9/08 342/357.4 |
| 5,924,654 | A * | 7/1999 | Anderson | B60T 17/228 105/157.1 |
| 6,416,020 | B1 * | 7/2002 | Gronskov | B61K 9/12 246/169 D |
| 6,539,293 | B2 * | 3/2003 | Bachtiger | B61K 9/08 701/20 |
| 6,668,239 | B1 * | 12/2003 | Gilbert | B61K 9/08 34/342 |
| 7,543,499 | B2 * | 6/2009 | Stubenrauch | G01M 13/045 73/593 |
| 7,853,412 | B2 * | 12/2010 | Xia | B61K 9/08 702/141 |
| 7,860,633 | B2 * | 12/2010 | Stubenrauch | G01M 13/045 701/60 |
| 8,905,359 | B2 * | 12/2014 | Li | B61L 23/045 246/120 |
| 9,212,902 | B2 * | 12/2015 | Enonnoto | G01B 11/245 |
| 9,469,198 | B2 * | 10/2016 | Cooper | B60L 3/10 |
| 9,476,802 | B2 * | 10/2016 | Sato | G01L 5/18 |
| 9,701,326 | B2 * | 7/2017 | Kull | B61L 23/044 |
| 10,081,379 | B2 * | 9/2018 | Kull | B61L 27/0088 |

FOREIGN PATENT DOCUMENTS

| WO | 0070148 A1 | 11/2000 |
|---|---|---|
| WO | 2006130908 A1 | 12/2006 |

OTHER PUBLICATIONS

J. S. Lee, S. Choi, S. S. Kim, Y. G. Kim, S. W. Kim, and C. Park, "Track condition monitoring by in-service trains: a comparison between axle-box and bogie accelerometers," 5th IET Conference on Railway Condition Monitoring and Non-Destructive Testing (RCM 2011), pp. 3A1-3A1, 2011.

R. Molodova, M; Li, Z; Dollevoet, "An investigation of the possibility to use axle box acceleration for condition monitoring of welds," in Proceedings of ISMA 2008: International Conference on Noise and Vibration Engineering, 2008, pp. 2879-2886.

V. Real, Ji; Montalban, L; Real, T; Puig, "Development of a system to obtain vertical track geometry measuring axle-box accelerations from in-service trains," Journal of Vibroengineering, vol. 14, No. 2, pp. 813-826, 2012.

J. S. Lee, S. Choi, S.-S. Kim, C. Park, and Y. G. Kim, "A Mixed Filtering Approach for Track Condition Monitoring Using Accelerometers on the Axle Box and Bogie," IEEE Transactions on Instrumentation and Measurement, vol. 61, No. 3, pp. 749-758, Mar. 2012.

A. N. Barbera, R. Corradi, D. Meccanica, P. Milano, V. G. La Masa, P. Barilaro, S. Atac, A. U. O. M. Rotabile, V. C. Ferranti, and M. E. R. M. E. C. S. A, "Continuous track quality monitoring in metro networks through vibration measurements taken on vehicles in standard operation," 2012.

C. Chellaswamy, V. Akila, a. Dinesh Babu, and N. K. Arasan, "Fuzzy logic based railway track condition monitoring system," 2013 IEEE International Conference on Emerging Trends in Computing, Communication and Nanotechnology (ICECCN), no. Iceccn, pp. 250-255, Mar. 2013.

H. Tsunashima, Y. Naganuma, a. Matsumoto, T. Mizuma, and H. Mori, "Japanese railway condition monitoring of tracks using in-service vehicle," 5th IET Conference on Railway Condition Monitoring and Non-Destructive Testing (RCM 2011), pp. 3A2-3A2, 2011.

* cited by examiner

METHOD AND SYSTEM FOR DETERMINING A VERTICAL PROFILE OF A RAIL SURFACE

CROSS REFERENCE TO RELATED APPLICATIONS

This application claims priority to European patent application no. 16380010.5 filed on Mar. 17, 2016, the contents of which are fully incorporated herein by reference.

FIELD OF THE INVENTION

The invention relates to the condition monitoring of railway tracks. More specifically, the invention relates to a method and system for determining a vertical profile of a rail surface using vertical acceleration measurements.

BACKGROUND OF THE INVENTION

The rail surface of railway tracks experiences wear due to wheel-rail interactions. Over time, the rail surface may often exhibit defects known as corrugation, which is a form of cyclical wear. Severe corrugation will reduce the service life of rail vehicles that run on the rail, meaning that is important for railway and infrastructure operators to be able to detect such surface defects so that necessary track maintenance can be performed.

Track recording vehicles are known, which include instruments for measuring many different attributes of a railway track. These are specialized vehicles which can be operated only at infrequent intervals, especially on busy lines. The use of in-service vehicles is much preferable.

One example of a method for detecting rail-top defects using measurements obtained from sensors that can be mounted to an in-service vehicle is known from EP 2464555. The method employs an axle box acceleration signal. A vertical and a longitudinal axle box acceleration signal are measured, whereby the longitudinal acceleration is used to remove a signal part from the vertical acceleration signal that relates to vibrations of the wheel set.

A further example is disclosed in U.S. Pat. No. 6,668,239. The method is carried out using a vehicle that is equipped with a vertical acceleration sensor mounted to the vehicle frame at each side of the bogie. The instrumentation package further includes a linear displacement transducer connected between the frame a wheel bearing at each axle end, for measuring vertical displacements of the wheel relative to the frame. The acceleration signal is digitized and subjected to double integration, to obtain vertical displacements of the frame. The corresponding displacements of the top surface of the rail are calculated from the obtained vertical frame displacements and the measured displacements of the wheel relative to the frame.

There is room for improvement.

BRIEF SUMMARY OF THE INVENTION

The invention defines a method of determining a vertical profile of a rail surface that can be implemented using only one vertical acceleration sensor per rail, and which achieves a high level of accuracy. The method provides steps of:

obtaining a vertical acceleration signal $acc1$, by measuring vertical acceleration of a bogie of a rail vehicle that runs on the rail surface;

processing the vertical acceleration signal $acc1$ to obtain a vertical velocity signal $vel1$;

determining the vertical profile signal of the rail surface, by using the vertical acceleration signal $acc1$ and the vertical velocity signal $vel1$ as inputs to a simulation model of the bogie, the model comprising an unsprung mass $m1$ connected to a sprung mass $m2$, wherein the vertical acceleration signal $acc1$ represents the vertical acceleration of the unsprung mass $m1$; and measuring a linear velocity signal $n$ of the rail vehicle, wherein the linear velocity signal is used in the step of determining to convert the vertical profile signal $z$ from the time domain to the distance domain.

Preferably, vertical acceleration is measured at an axle box on the bogie, which supports a wheel that runs on the rail and is thus influenced by undulations or corrugations in the rail surface. The dynamic behaviour of the bogie is simulated using a suitable model of the bogie, such as a quarter-bogie model. It is assumed that the axle box, which forms part of the unsprung mass of the bogie, is connected via a primary suspension to a second mass, which is the sprung mass.

The corresponding equations of motion are then solved using the known mass parameters, stiffness parameters and damping parameters of the system, the measured acceleration signal $acc1$ and the vertical velocity signal $vel1$ that is obtained during the step of processing.

In one example, the step of processing provides filtering the vertical acceleration signal $acc1$ using a Butterworth filter. The filtered signal is then converted to the frequency domain, where a single integration operation is performed. The integrated signal is then converted back to the time domain using an inverse Fast Fourier Transform.

In the method of the invention, the measured signal is subjected to only one integration operation. In comparison with prior art methods, the processed signal provides relatively little noise, leading to a more accurate result when the equations of motion are solved.

Suitably, once the vertical profile signal has been calculated in the time domain, it is transformed into the distance domain using the linear speed signal.

It then becomes possible to classify surface defects, i.e. corrugations, according to their wavelength. In one example, the vertical signal profile undergoes band-pass analysis in three wavelength bands:

30-80 mm;
80-300 mm;
300-1000 mm.

Needless to say, the number of wavelength bands and their width can vary depending on national or international regulations.

The signal may be filtered in each band using e.g. a 3-order Butterworth filter. Suitably, corrugation detection is performed in each wavelength band; for example, by applying a threshold to the RMS amplitude or the peak-to-peak amplitude of the signal.

In a further example, the method of the invention provides converting the vertical profile signal from the distance domain to the wavelength domain. Alarm thresholds may then be defined for the signal amplitude in the wavelength domain, for a specific wavelength band, such that an alert is transmitted if the signal amplitude exceeds the threshold.

Thus, potentially harmful corrugations that require repair or maintenance can be identified. In order to locate the exact position of the defects, the vertical profile signal in the distance domain is calculated with respect to distance from a reference point of known geographic position. This information may be obtained, for example, from GPS or from other position location means.

The present invention further defines a condition monitoring system for detecting corrugations in a rail surface, the system comprising:

an accelerometer for measuring vertical acceleration, whereby the accelerometer is mounted to a bogie of a rail vehicle that runs on the rail;

a speed sensor for measuring a linear speed of the rail vehicle;

a processor configured to receive a vertical acceleration signal acc1 from the accelerometer and to receive a linear speed signal n from the speed sensor.

The processor is programmed to implement the step of determining according to the method of the invention, to obtain a vertical profile signal z of the rail surface.

Suitably, the condition monitoring system further provides means for position location, so that the vertical profile signal z may be calculated in the distance domain with reference to a fixed reference of known position.

In one embodiment, the processor is further configured to perform a band-pass analysis of the vertical profile signal, to characterize the signal in terms of different wavelength bands corresponding to different classes of corrugation.

In a further embodiment, the processor is configured to convert the vertical profile signal z into the wavelength domain and is programmed to transmit an alert if an amplitude of the signal in wavelength domain exceeds a predetermined maximum value that has been set for a specific wavelength band.

The invention will now be described in more detail, with reference to the accompanying figures.

DETAILED DESCRIPTION OF THE INVENTION

Figure 1:
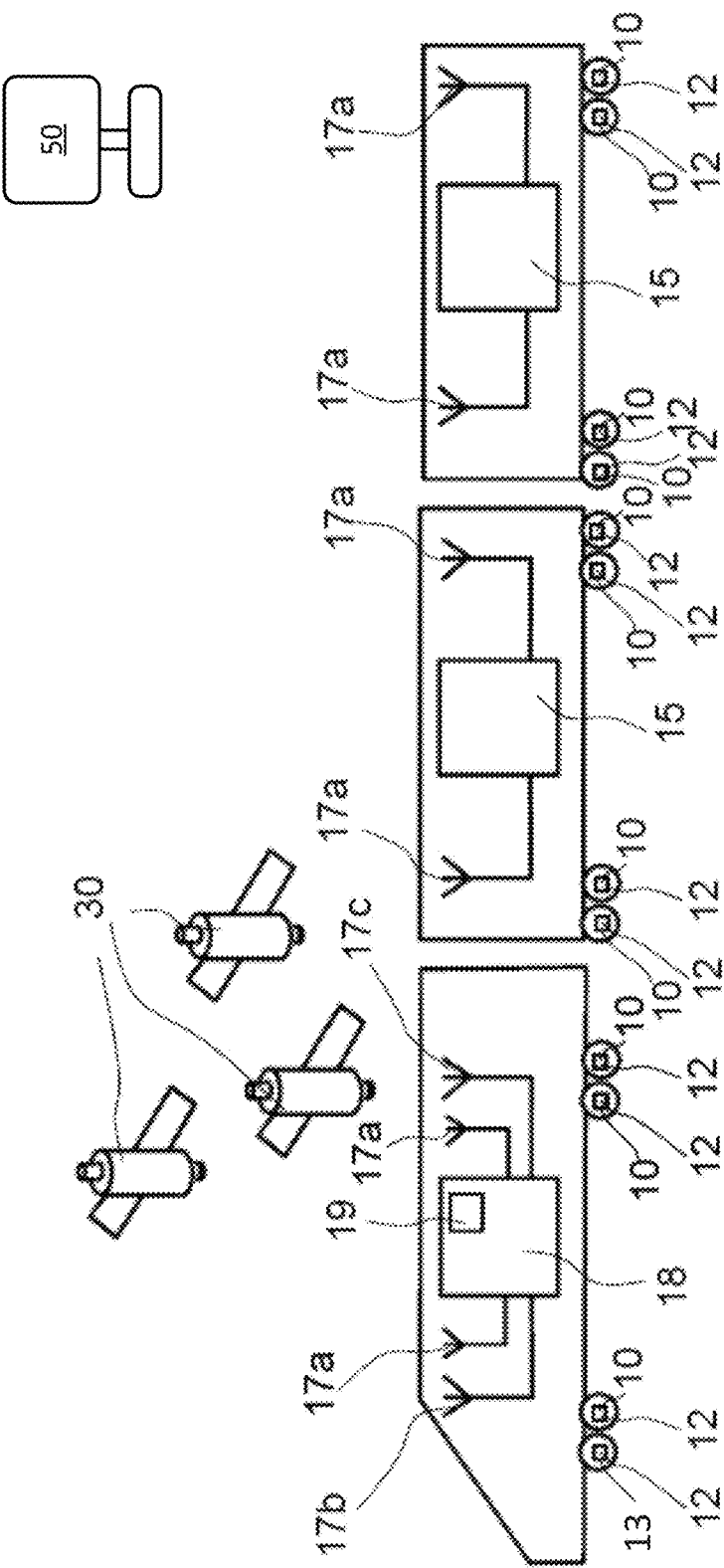
FIG. 1 is a schematic representation of a train including a condition monitoring system for bearing units that is suitable for use in the method according to the invention.

FIG. 1 is a schematic representation of a train including a condition monitoring system for bearing units of the train. The system provides multiple condition monitoring units 10—one for each wheel of the train—for measuring at least one operating parameter of one bearing unit of a train axle box. In the depicted example, the condition monitoring units 10 are formed as wireless sensor nodes attached to or embedded into the end plate of a double row roller bearing assembly of the hub (not shown). In other examples, the system for measuring and collecting data may be a wired system.

The measured operating parameters include vibrations, and each unit 10 is equipped with an accelerometer 12 that measures acceleration in the vertical direction. Typically, bearing temperature is also measured. In addition, at least one condition monitoring unit is equipped with a rotational speed sensor 13.

A control unit 18 for receiving and processing signals obtained from the condition monitoring units 10 is provided in a locomotive of the train. The communication between the control unit 18 and the condition monitoring units 10 is at least partially wireless using antennae 17a. If necessary, each of the wagons is provided or some of the wagons are provided with a remote network manager 15 serving as a wireless network manager, a power supply manager for the units 10 and as a wireless network extender. The wireless network can be a single-band 2.4 GHz network or a dual band 2.4 GHz and 5 GhHz network. The skilled person may use other communication frequencies or protocols including different protocols for the backbone and for the communication between extenders and the units 10 depending on the circumstances.

The control unit 18 is further equipped with a GPS antenna 17c and with an antenna 17b for a mobile communication interface using e.g. a GSM, GPRS, UMTS, LTE or HSDPA standard.

In the embodiment of FIG. 1, the control unit 18 provides a GPS receiver 19 receiving positioning signals from a system of satellites 30 as means for detecting a geographic position.

The train runs on a railway track (not shown). The individual rails may contain surface defects, such as corrugations, that affect the vertical acceleration measured by the sensors 12. The main purpose of the condition monitoring units 10 is to gather data on the health of the bearings. The control unit 18 may be programmed to analyse the measured data in real time, or may be configured to transmit the data to e.g. a server for storage in a database. The recorded and transmitted data is preferably tagged with positional information obtained from the GPS receiver 19.

The data may then be retrieved from the database and analysed remotely by a computer 50 that is programmed, for example, to identify defective operation of the wheel bearings. In the method of the invention, the gathered data is additionally used for condition monitoring of the rails. Specifically, a vertical profile of the rail surfaces is determined, in order to identify track sections where corrugations have a magnitude that is potentially harmful to the service life of rail vehicles.

Figure 2:
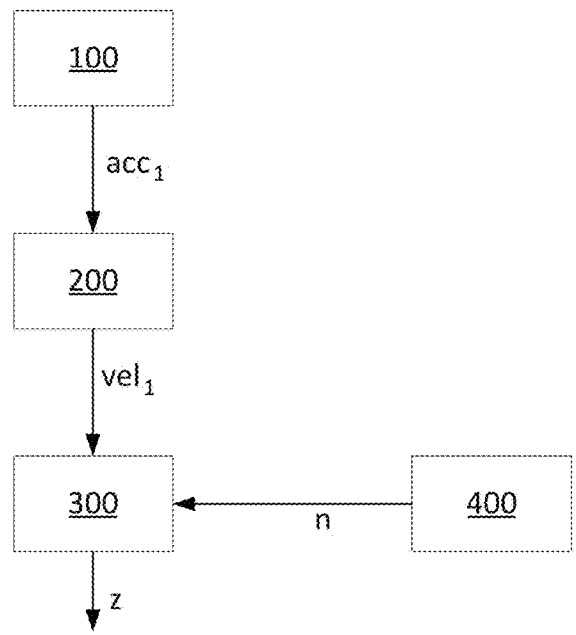
FIG. 2 is a flowchart of an example of method according to the invention.

The method of the invention is depicted by the flow chart in FIG. 2.

In a first step 100, a vertical acceleration signal acc1 is obtained from at least one accelerometer 12.

In a second step 200, the vertical acceleration signal is processed to obtain a vertical velocity signal v1.

The processing suitably provides filtering of the signal using e.g. a Butterworth filter in the passband of interest. Typically, a high-pass filter with a cut-off frequency of 10 Hz is used. The filtered signal is converted to the frequency domain and is then integrated to obtain a velocity signal in the frequency domain. An inverse FFT is then applied to obtain the vertical velocity signal v1 in the time domain. Omega Arithmetic is one example of a processing method that may be used to obtain the velocity signal veil from the acceleration signal acc1.

In a third step 300, the vertical velocity signal veil and the vertical acceleration signal acc1 are used as inputs to a simulation model of the bogie on which the accelerometer 12 is mounted, to obtain a track signal z of vertical undulations.

Figure 3:
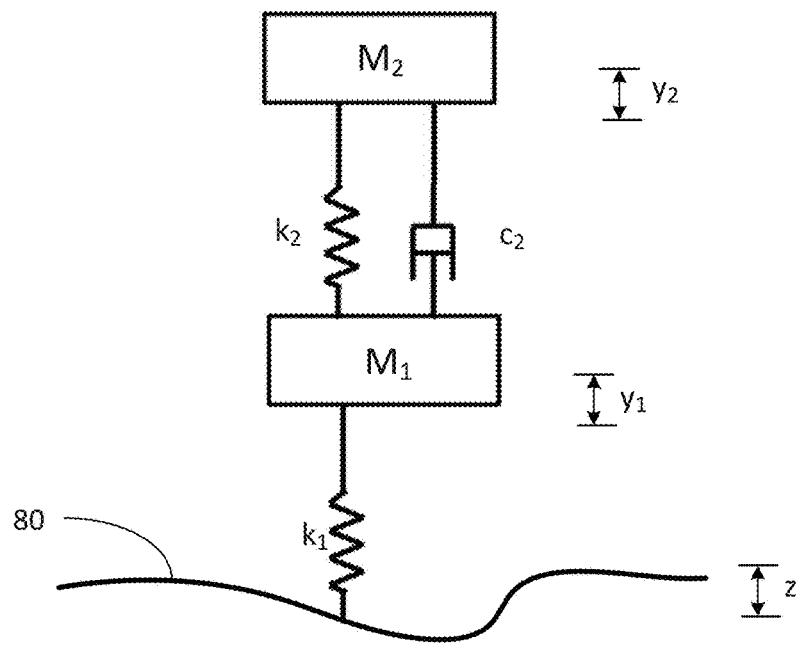
FIG. 3 depicts a quarter-bogie model that is used in the method according to the invention.

This will be explained with reference to FIG. 3, which shows a two-mass model of a bogie. The depicted model is generally known as a quarter-bogie model and is widely used in railway vibrations engineering. The model considers the train as two masses connected by a spring k2 and a damper c2, representing the primary suspension. The upper mass m2 represents a quarter of the mass of a bogie frame and train housing. The lower mass m1 simulates half of an axle mass and is an unsprung mass. In response to undulations in the rail surface 80, i.e. the vertical rail profile, the upper and lower masses m2 and m1 undergo vertical displacements y2 and y1 respectively. The displacements are influenced by the wheel-to-rail contact stiffness, which is represented by a spring k1. The function to be obtained is z, the vertical rail profile.

The equations of motion for the quarter-bogie model in the time domain are as follows:

$$m2\ddot{y}2 + c2(\dot{y}2-\dot{y}1) + k2(y2-y1) = 0 \quad [1]$$

$$m1\ddot{y}1 - c2\ddot{y}2 + c1\dot{y}1 - k2y2 + (k1+k2)y1 - k1z = 0 \quad [2]$$

The accelerometer 12 measures the vertical acceleration of the unsprung mass m1, meaning that the vertical acceleration signal acc1 is equivalent to $\ddot{y}1$. The vertical velocity signal vel1 that is obtained from acc1 is therefore equal to $\dot{y}1$. Further known parameters are the masses m1 and m2 (kg), the spring coefficient k2 (N/m) and damping coefficient c2 of the primary suspension and the spring coefficient k1 (N/m) of the wheel contact stiffness.

First, equation [1] is solved using the vertical velocity signal vel1.

Suitably, state variables x1, x2 and x3 are defined, whereby:

x1=y1 (vertical displacement of m1), implying that $\dot{x}1$=vel1.

x2=y2 (vertical displacement of m2).

x3=$\dot{x}2$, which implies that $\dot{x}3$=$\ddot{y}2$ (vertical velocity of m2).

Equation [1] may therefore be expressed in state-variable form as:

$$m2\dot{x}3 + c2(x3-vel1) + k2(x2-x1) = 0$$

such that $$\dot{x}3 = \frac{k2}{m_2}x_1 - \frac{k2}{m_2}x_2 - \frac{c_2}{m_2}x_3 + \frac{c_2}{m_2}vel_1$$

Using known stiffness and damping matrices, equation [1] can be solved as follows:

$$\begin{bmatrix}\dot{x}_1\\\dot{x}_2\\\dot{x}_3\end{bmatrix} = \begin{bmatrix}0 & 0 & 0\\0 & 0 & 1\\\frac{k_2}{m_2} & -\frac{k_2}{m_2} & -\frac{c_2}{m_2}\end{bmatrix}\begin{Bmatrix}x_1\\x_2\\x_3\end{Bmatrix} + \begin{Bmatrix}1\\0\\\frac{c_2}{m_2}\end{Bmatrix}vel_1$$

$$\begin{bmatrix}y_1\\y_2\\\dot{y}_2\end{bmatrix} = \begin{bmatrix}1 & 0 & 0\\0 & 1 & 0\\0 & 0 & 1\end{bmatrix}\begin{Bmatrix}x_1\\x_2\\x_3\end{Bmatrix} + \begin{Bmatrix}0\\0\\0\end{Bmatrix}vel_1$$

to obtain the vertical displacement y1 of the unsprung mass m1, the vertical displacement y2 of the sprung mass m2 and the vertical velocity $\dot{y}2$ of the sprung mass m2.

Equation [2] can now be solved for the function z:

$$z = \frac{m_1}{k_1}acc_1 + \frac{c_2}{k_1}vel_1 + \frac{(k_1+k_2)}{k_1}\dot{y}2 - \frac{k_2}{k_1}y_2$$

Thus, the vertical acceleration signal acc1 is used directly to solve the equations of motion associated with the model. Furthermore, this signal is subjected to only one integration process, to obtain the vertical velocity signal vel1, which is also used as an input to solving the equations. The calculated vertical profile signal z therefore contains minimal noise and has a high degree of accuracy.

Returning to FIG. 2, the method of the invention suitably provides converting the calculated signal from the time domain to the distance domain. The method provides a further step 400 of obtaining a speed signal n of the train. In one example, at least one wheel of the train is equipped with a rotational speed sensor 13 (refer FIG. 1), whereby the measured speed in rpm is converted to a linear speed of the train using the known wheel diameter.

Figure 4:
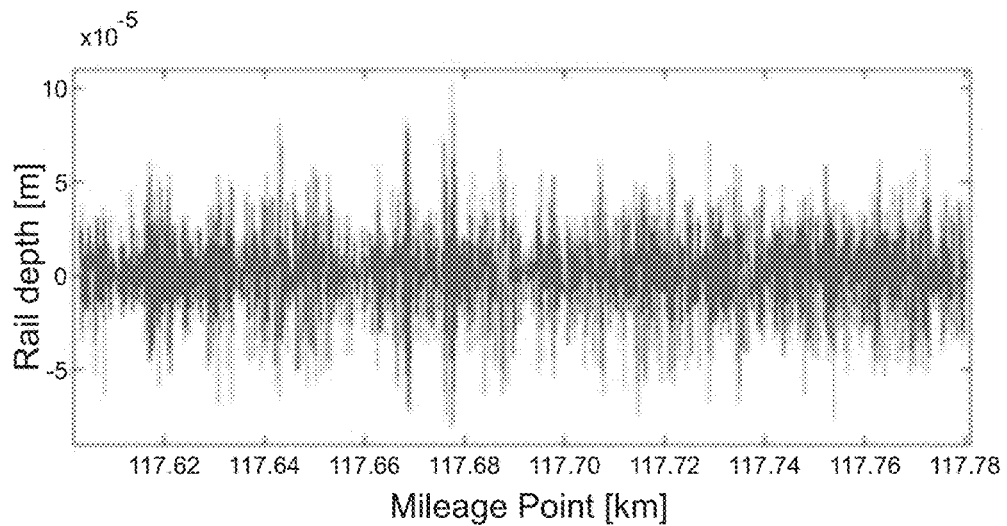
FIG. 4 shows an example of a vertical profile signal in the distance domain, obtained using the method of the invention.

Using the measured speed, distance from a fixed reference point can be calculated. In order to locate the vertical track profile in the "real world", the position of the fixed reference point may be obtained, for example, from the GPS receiver 19 or from a waypoint that triggers the gathering of vertical acceleration data along a particular route section. Alternatively, the location of objects at known positions along or adjacent to the track, such as points or crossings, may be detected. Dead reckoning methods may also be used, including inertial guidance systems, and measuring distance from known positions An example of the vertical profile signal z in the distance domain is shown in FIG. 4.

Surface defects are usually classified according to their wavelength. In a metro line, for example, very short-pitch corrugations have a wavelength λ of 3-8 cm; short-pitch corrugations have a wavelength λ of 8-30 cm; medium-pitch corrugations have a wavelength λ of 30-100 cm.

Figure 5:
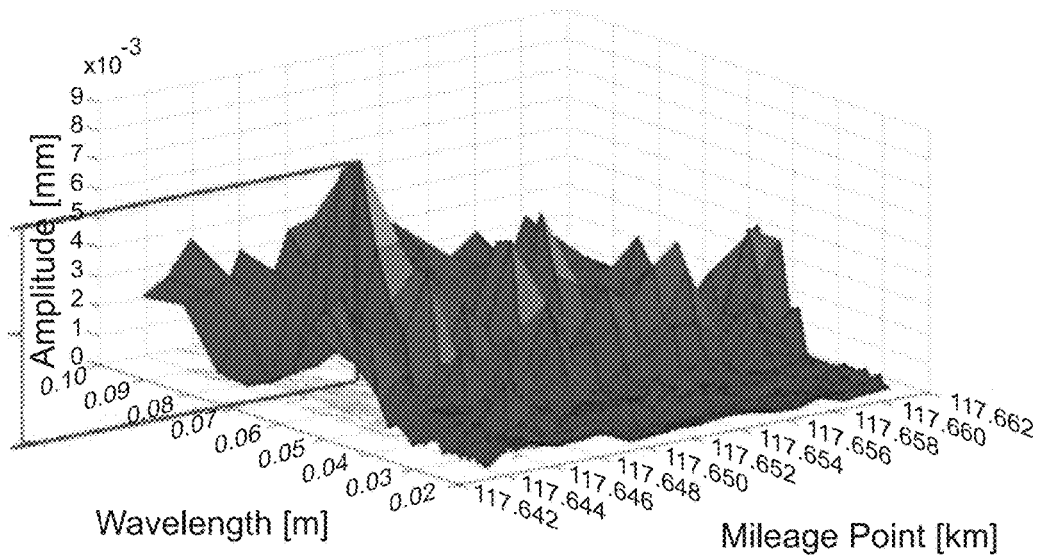
FIG. 5 shows an example of a vertical profile signal in the wavelength domain, obtained using the method of the invention.

The wavelength of track corrugations and their amplitude can be obtained from the vertical profile signal z. Suitably, the signal is converted to the wavelength domain, to enable defects to be classified according to their wavelength. An example of the track signal z plotted in the wavelength domain is shown in the periodogram of FIG. 5.

Once obtained, the vertical profile signal is used to identify track sections that may require maintenance. For example, alarms can be set according to the amplitude of defects within a specific wavelength band.

Thus, an in-service vehicle that is instrumented for monitoring bearing health can additionally be used for monitoring the condition of the track on which the rail vehicle runs. As will be understood, the method and system of the invention may be solely dedicated to the identification of surface defects in the track.

The invention claimed is:

1. A method of determining a vertical profile signal of a rail surface, the method comprising:

obtaining a vertical acceleration signal by measuring vertical acceleration of a bogie of a rail vehicle that runs on the rail surface;

processing the vertical acceleration signal to obtain a vertical velocity signal;

determining the vertical profile signal of the rail surface utilizing a simulation model of the bogie, the vertical acceleration signal and the vertical velocity signal being inputs to the simulation model, the simulation model comprising an unsprung mass connected to a sprung mass, wherein the vertical acceleration signal represents the vertical acceleration of the unsprung mass; and measuring a linear velocity signal of the rail vehicle, the linear velocity signal being utilized to convert the vertical profile signal from a time domain to a distance domain;

converting the vertical profile signal to a wavelength domain to provide a wavelength domain signal;

determining whether an amplitude of the wavelength domain signal exceeds a predetermined maximum value set for a specific wavelength band; and transmitting an alert when the amplitude of the wavelength domain signal exceeds the predetermined maximum value.

2. The method of claim 1, wherein the step of processing further comprises:

filtering the vertical acceleration signal to provide a filtered signal;

converting the filtered signal to a frequency domain to provide a converted signal;

executing a single integration of the converted signal in the frequency domain to provide an integrated signal; and obtaining the vertical velocity signal by converting the integrated signal to the time domain.

3. The method of claim 1, wherein the simulation model of the bogie is a quarter-bogie model.

4. A condition monitoring system for detecting corrugations in a rail surface of a rail, the condition monitoring system comprising:

an accelerometer for measuring vertical acceleration, the accelerometer being mounted to a bogie of a rail vehicle that runs on the rail;

a speed sensor for measuring a linear speed of the rail vehicle;

a processor configured to receive a vertical acceleration signal from the accelerometer and to receive a linear speed signal from the speed sensor; wherein, the processor is programmed to determine a vertical profile signal of the rail surface utilizing a simulation model of the bogie the vertical acceleration signal and the vertical velocity signal being inputs to the simulation model, the model comprising an unsprung mass connected to a sprung mass, wherein the vertical acceleration signal acct represents the vertical acceleration of the unsprung mass, converts the vertical profile signal to a wavelength domain to provide a wavelength domain signal, determines whether an amplitude of the wavelength domain signal exceeds a predetermined maximum value set for a specific wavelength band, and transmits an alert when the amplitude of the wavelength domain signal exceeds the predetermined maximum value.

5. The condition monitoring system of claim 4, further comprising means for position location to calculate the vertical profile signal in the distance domain with reference to a fixed reference of known position.

6. The condition monitoring system of claim 4, wherein the processor is configured to perform a band-pass analysis of the vertical profile signal, to characterize the signal in terms of different wavelength bands corresponding to different classes of corrugation.

* * * * *